US008348096B2

(12) United States Patent
Greiner-Perth

(10) Patent No.: US 8,348,096 B2
(45) Date of Patent: Jan. 8, 2013

(54) DISCHARGE DEVICE WITH DISCHARGE STROKE WHICH REDUCES VOLUME OF MEDIA AND DOSAGE CHAMBERS

(75) Inventor: Juergen Greiner-Perth, Gottmadigen (DE)

(73) Assignee: Ing. Erich Pfeiffer GmbH, Radolfzell (DE)

( * ) Notice: Subject to any disclaimer, the term of this patent is extended or adjusted under 35 U.S.C. 154(b) by 380 days.

(21) Appl. No.: 12/798,407

(22) Filed: Apr. 2, 2010

(65) Prior Publication Data

US 2010/0252581 A1 Oct. 7, 2010

(30) Foreign Application Priority Data

Apr. 2, 2009 (DE) ......................... 10 2009 017 459

(51) Int. Cl.
*B67D 7/22* (2010.01)
*G01F 11/00* (2006.01)

(52) U.S. Cl. ....... 222/50; 222/162; 222/319; 222/321.5; 222/321.6; 222/321.9; 222/209; 222/377; 222/386

(58) Field of Classification Search ............. 128/203.28; 222/41, 47, 49, 50, 105, 207, 209–212, 214, 222/319, 320, 321.1, 321.2, 321.5, 321.6, 222/339, 377–380, 383.1, 385, 386.5, 398, 222/162, 321.9, 386; 239/73, 323, 338, 350; 604/246, 298, 407
See application file for complete search history.

(56) References Cited

U.S. PATENT DOCUMENTS 1,810,135 A 6/1931 Fitch
1,926,367 A * 9/1933 Booth ........................... 222/320
1,930,872 A 10/1933 Blackmun
3,185,345 A * 5/1965 Hunegs ........................... 222/45
3,878,973 A * 4/1975 Riccio ........................... 222/319
4,098,434 A * 7/1978 Uhlig .............................. 222/94
4,177,939 A * 12/1979 Thomas ................... 222/153.13
4,413,757 A * 11/1983 Adler ............................ 222/105
4,921,142 A * 5/1990 Graf et al. ..................... 222/162
5,353,961 A * 10/1994 Debush ........................... 222/94
5,366,120 A 11/1994 Tollasepp
6,405,905 B1 6/2002 Sogaro
6,769,576 B2 * 8/2004 Ichikawa .................. 222/321.5
7,131,559 B2 * 11/2006 Schultz ......................... 222/377
(Continued)

FOREIGN PATENT DOCUMENTS

DE 8522082 12/1985
DE 37 12 802 C1 6/1988
EP 1 199 106 A1 4/2002
(Continued)

*Primary Examiner* — Kevin P Shaver
*Assistant Examiner* — Patrick M Buechner
(74) *Attorney, Agent, or Firm* — Flynn, Thiel, Boutell & Tanis, P.C.

(57) ABSTRACT

A discharge device for liquid media having housing sections movable relative to one another along a total stroke between a non-actuated rest position and an actuated end position and together forming a manual actuating device. A media reservoir stores the medium prior to discharge, and a conveying device includes a discharge opening and a dosage chamber. The actuating and conveying devices are operatively coupled such that during a first partial stroke of the discharge actuation starting from the rest position the media reservoir and the dosage chamber are in communicating connection and during a second partial stroke of the discharge actuation following the first partial stroke the media reservoir and the dosage chamber are separated, the volume of the dosage chamber and the media reservoir being reduced by the second partial stroke of the discharge actuation.

18 Claims, 4 Drawing Sheets

U.S. PATENT DOCUMENTS

| | | | | |
|---|---|---|---|---|
| 7,243,821 | B2 | 7/2007 | Bougamont et al. | |
| 2002/0020716 | A1 * | 2/2002 | Albisetti | 222/160 |
| 2002/0047027 | A1 | 4/2002 | Sogaro | |
| 2005/0161472 | A1 * | 7/2005 | Lasserre et al. | 222/105 |
| 2006/0065675 | A1 | 3/2006 | Bougamont et al. | |

FOREIGN PATENT DOCUMENTS

| | | | |
|---|---|---|---|
| EP | 1 606 192 | B1 | 12/2005 |
| WO | WO 02/094708 | A1 | 11/2002 |
| WO | WO 2006092590 | A2 * | 9/2006 |

* cited by examiner

DISCHARGE DEVICE WITH DISCHARGE STROKE WHICH REDUCES VOLUME OF MEDIA AND DOSAGE CHAMBERS

FIELD OF INVENTION

The invention relates to a discharge device for liquid media, in particular for pharmaceutical media, having two housing sections movable relative to one another along a total stroke between a non-actuated rest position and an actuated end position and together forming an actuating device for manual discharge actuation, having a media reservoir for storage of the medium prior to discharge and having a conveying device with a discharge opening and a dosage chamber. The actuating device and the conveying device are, in generic discharge devices, operatively coupled such that during a first partial stroke of the discharge actuation starting from the rest position the media reservoir and the dosage chamber are in communicating connection and such that during a second partial stroke of the discharge actuation following the first partial stroke the media reservoir and the dosage chamber are separated from one another, the volume of the dosage chamber being reduced by the second partial stroke of the discharge actuation such that the medium is pressed out of the dosage chamber to the discharge opening.

BACKGROUND OF THE INVENTION

A generic discharge device of this type is known for example from EP 1 606 192 B1.

SUMMARY OF THE INVENTION

The problem underlying the invention is to develop a generic discharge device in respect of a structure that is simplified and/or suitable for preservative-free medications and in respect of an improved functionality.

To do so, it is provided in accordance with the invention that the media reservoir is operatively coupled with the actuating device such that a discharge actuation of the actuating device simultaneously achieves a volume reduction of the media reservoir.

The housing sections provided in accordance with the invention are understood as being two parts of the discharge device which are accessible to a user at least in some sections from the outside and that are movable relative to one another. The housing sections can be designed in one piece or can be composed of several components firmly connected to one another. The housing sections are designed to be moved relative to one another in accordance with the intended purpose in order to achieve a discharge process. They therefore preferably each have finger contact surfaces simplifying manual handling. The housing sections are preferably displaceable relative to one another translatively in a linear actuation direction, the actuation direction preferably being oriented such that the housing sections are displaced towards one another during a discharge process.

The housing sections together form an actuating device with which the conveying device can be actuated. This conveying device has a dosage chamber which is separated from the media reservoir during the relative movement of the housing sections, so that a subsequent volume reduction of the dosage chamber during the continued relative movement of the housing sections does not lead to the medium flowing out of the dosage chamber back into the media reservoir. Instead the volume reduction of the dosage chamber after the separation from the media reservoir leads to a discharge process, since the medium from the dosage chamber can only escape in the direction of the discharge opening.

In accordance with the invention, the actuating device is designed such that it achieves not only the separation of the dosage chamber from the media reservoir and the subsequent discharge process; instead the actuating device is additionally operatively coupled with the media reservoir such that the manual discharge actuation also achieves a volume reduction of the media reservoir simultaneously with the discharge process. The operative coupling between the actuating device and the media reservoir can be designed here in such a way that the volume reduction of the media reservoir is achieved during the first partial stroke or during the second partial stroke. A design in which a reduction of the media reservoir volume takes place during the first and the second partial stroke is particularly advantageous.

This volume reduction of the media reservoir leads to a positive pressure forming in the media reservoir and subjecting the housing sections to a force in the direction of the rest position due to the operative coupling with the actuating device. The medium under this positive pressure and the air inside the media reservoir under this positive pressure thus act during the discharge actuation as a kind of air spring which, after completion of the discharge process and after loss of the manual force on the discharge device, presses the housing sections back in the direction of the rest position. This air spring can therefore play a crucial part in the resetting of the discharge device. Depending on the specific design, an additional spring element, in particular a metallic return spring, can be dispensed with. Dispensing with a metallic spring in contact with media is advantageous in particular in the case of preservative-free media.

For the volume reduction to result in the required positive pressure and hence in the air spring function, it must be assured that particularly after separation of the media reservoir little or no air from the media reservoir escapes into the environment. The media reservoir can for this purpose be completely isolated from the environment or only permit air ingress. It is also possible to use an air filter between the environment and the media reservoir that only permits discharge of air to a minor extent. An air filter of this type is preferably designed to allow an air discharge of max. 10 ml/min at a positive pressure of 2 mbars in the media reservoir, preferably 6 ml/min. Such a low discharge of air from the media reservoir does not impair the air spring function to any relevant extent.

The interaction between the actuating device and the media reservoir is preferably achieved by a direct mechanical coupling, for example in that the position of the housing sections relative to one another leads directly to the displacement of walls of the media reservoir relative to one another.

It is regarded as advantageous when the media reservoir is not completely filled with the medium even in the as-delivered state of the discharge device, so that there is sufficient air inside the media reservoir to ensure the air spring function as described. The media quantity inside the media reservoir is preferably dimensioned such that the medium has no more than 90%, in particular no more than 80% of the volume of the volume-reduced media reservoir in the end position of the housing sections.

In a preferred design, the volume of the media reservoir in the rest position is max. 50 ml in the as-delivered state, and in particular preferably between 2 ml and 10 ml. These volumes are as a rule sufficient for the application in accordance with the intended purpose, namely use for pharmaceutical media. Based on the volume of the media reservoir in its rest position in the as-delivered state, the operative coupling of the media reservoir with the dosage chamber is preferably designed such that the volume of the media reservoir is reduced by at least 10% during the total stroke comprising the first and the second partial strokes. The volume reduction is preferably at least 15%, in particular preferably at least 20%.

Particularly advantageous is an embodiment in which the discharge device is designed and/or filled with medium such that a reduction of the medium contained in the media reservoir and/or of the air contained in the media reservoir achieves a reduced distance between the two housing sections in the rest position.

The rest position in the meaning of this invention is considered to be a relative position of the housing sections to one another in which a balance of forces prevails, whereas the housing sections are not subjected to any external force whatsoever. While it is usual in most discharge devices from the prior art that this rest position is defined by stops fixed on the housing and that a return spring of these discharge devices is designed such that this rest position as defined by the stops is resumed after every discharge process, it is provided in accordance with this embodiment that a reduction of the media quantity and/or of the air quantity in the media reservoir also alters the rest position of the housing sections. This is achieved in particular in that after a discharge process no equalizing air is sucked into the media reservoir. It is therefore preferred that the media reservoir is connected to an environment only indirectly via the dosage chamber and that an outlet valve is provided between the dosage chamber and the discharge opening which prevents any inflow of air into the dosage chamber through the discharge opening. Accordingly, the medium discharged during a discharge process cannot be replaced by air in the media reservoir. Instead, the total quantity of the medium and of the air inside the media reservoir is continually reduced over the service life of the dispenser. The stated outlet valve is preferably designed as an outlet valve operating dependently on pressure and opening during the discharge process due to increased media pressure in the dosage chamber and automatically closing during the return stroke so that no air can flow in this way into the media reservoir.

Return spring means of the discharge device are preferably designed sufficiently weak here that they do not effect a complete resetting against the negative pressure resulting inside the media reservoir due to the reduced media quantity. Instead, the stated balance of forces and hence the rest state come into effect with a smaller volume of the media reservoir. Thanks to the operative coupling of the media reservoir with the actuating device, this volume reduction of the media reservoir also leads to a rest position of the housing sections that alters with every discharge process.

The fact that the rest position of the discharge device changes slightly with every discharge process offers the opportunity to use the position of the housing sections relative to one another in the rest position as an indicator for the media quantity remaining inside the media reservoir. In order to measure in a simple manner the relative position and hence the remaining media quantity, a scale or an indicator is provided preferably in a contact area of the housing sections. A scale is deemed to be a mark or a row of marks covered over to a varying extent or in a varying way depending on the relative position of the housing sections and hence permitting a simple measurement of the relative position. Besides a classic scale with several line marks parallel to one another, a design with a continuous colour transition or with a tapering symbol, for example a printed-on triangle, is therefore also possible. It is particularly advantageous when the housing sections are designed such that one of the housing sections is pushed into a recess of the other housing section, the scale is in this case being advantageously fitted on the housing section to be pushed in accordance with the intended purpose and hence making the insertion depth easy to measure.

The media reservoir is designed for the purpose of interaction with the actuating device preferably such that it is partially limited by a first wall stationary relative to the first housing section, and partially limited by a second wall stationary relative to the second housing section. This design has the result that the displacement of the housing sections relative to one another also directly effects a displacement of the first and second walls of the media reservoir to one another. The interactions described above between the actuating device and the media reservoir can as a result be achieved in a particularly simple way.

It is particularly advantageous when the media reservoir is partially limited by a third wall formed by a variable-shape intermediate component fastened to the first and the second housing sections. This variable-shape intermediate component forming the third wall is here in particular connected preferably in an all-round sealing manner to the first housing section on the one hand and to the second housing section on the other. A particularly good sealing of the media reservoir is thus achieved by this intermediate component, since sliding seals between components movable relative to one another can be dispensed with.

It is particularly advantageous when the intermediate component is designed elastic and the housing sections are subjected in the end position to a force that pushes the housing sections in the direction of the rest position. The intermediate component thus assumes not only an advantageous sealing function, but also at the same time a spring function in that it is elastically tensioned or compressed during the transition of the housing sections from the rest position to the end position, and releases the energy absorbed as a result during the return of the housing sections to their rest position once the discharge process is completed.

It is particularly advantageous here that this spring effect of the intermediate component together with the air spring effect described above in the volume-reduced media reservoir can obviate the need for an additional dedicated spring element.

It is considered particularly advantageous when the intermediate element is designed as a bellows, preferably as a bellows open on both sides and whose open sides are connected all-round to the first and the second housing sections.

The design as a bellows offers some crucial advantages: the bellows has a largely defined expansion and compression direction, so that the reduction of the media quantity and/or of the air quantity inside the media reservoir, and the concomitant reduction of the media reservoir volume in the rest position, lead to a defined position of the housing sections relative to one another in said rest position. Furthermore, the spring function of the intermediate element as described above is achieved in a simple manner by the bellows. The bellows is preferably oriented inside the discharge device such that its component-related compression direction matches the actuation direction of the discharge device, i.e. matches the displacement direction of the housing sections relative to one another.

The bellows can be designed such that it is only open in the direction of the dosage chamber and is closed in the opposite direction. The use of a bellows open on both sides is particularly advantageous, where the open ends are connected in each case to one of the housing sections. In this case the media reservoir comprises a cavity in the first housing section and a cavity in the second, the volume enclosed by the bellows forming a variable-volume third part of the media reservoir. As a result, a particularly large media reservoir can be provided.

As already described above, the actuating device and the conveying device are operatively coupled such that during a first partial stroke a connection exists between the media reservoir and the dosage chamber and during a subsequent second partial stroke in the same direction a separation of the dosage chamber from the media reservoir and a subsequent volume reduction of the dosage chamber takes place. To that end, it is preferably provided that the dosage chamber is formed by a cavity provided in one of the housing sections and open in the direction of the other housing section, with a piston section being provided on the other housing section which during actuation comes into all-round contact with a rim of the cavity during the transition from the first partial stroke to the second partial stroke, thereby separating the dosage chamber from the media reservoir.

The piston section is here preferably attached stationarily to the housing section to which it is assigned. During the first partial stroke, the cavity is still connected to the dosage chamber. As soon as the piston section enters the cavity, it makes all-round contact with the rim of the cavity and thus seals it off from the media reservoir. The dosage chamber thereby formed is subsequently reduced in volume by a continued displacement of the piston section and of the housing section assigned to it relative to the housing section with the dosage chamber cavity, in order to thereby initiate the discharge process.

The dosage chamber is preferably arranged relative to the media reservoir such that the medium from the media reservoir flows into the dosage chamber as a result of its weight when there is a communicating connection between the dosage chamber and the media reservoir. The dosage chamber is accordingly arranged underneath the media reservoir or at least underneath the liquid level of the medium inside the media reservoir. This arrangement underneath the media reservoir relates to a discharge position of the discharge device in accordance with the intended purpose. In the case of a nasal dispenser, this is for example a position in which the discharge opening is pointing approximately or precisely upwards.

In addition to the force caused by the weight, the medium can also be sucked into the dosage chamber by a negative pressure forming in the dosage chamber after discharge of the medium. A design in which the negative pressure in the dosage chamber together with the weight assures reliable refilling of the dosage chamber is particularly advantageous.

It is furthermore regarded as advantageous when the two housing sections are guided in a manner permitting movement relative to one another by direct contact. The actuation direction is defined with a guide of this type, which can for example be formed by cylindrical partial sections of the two housing sections inserted into one another. The partial sections forming the guide are preferably not part of the walls of the media reservoir, so that a liquid-tight seal between them can be dispensed with.

A design of the discharge device in accordance with the invention in which the first housing section comprises the discharge opening and the second housing section comprises a bottom of the discharge device is particularly advantageous. With a design of this type, a finger contact surface is furthermore preferably provided on the first housing section. A dedicated finger contact surface of this type can be dispensed with on the second housing section, since instead the bottom can be used as the second finger contact surface.

A discharge device in accordance with the invention is provided in particular for filling with a pharmaceutical medium. It can in particular be used for nasal, oral, ophthalmic or topical applications. In the case of a discharge device for nasal application, the discharge opening is preferably provided on a conical nose olive of sufficient dimensions to be inserted into a nostril of a user.

BRIEF DESCRIPTION OF THE DRAWINGS

Further aspects and advantages of the invention can be found not only in the claims, but also in the following description of a preferred embodiment of the invention which is explained using the following figures, in which:

DETAILED DESCRIPTION

Figure 1:
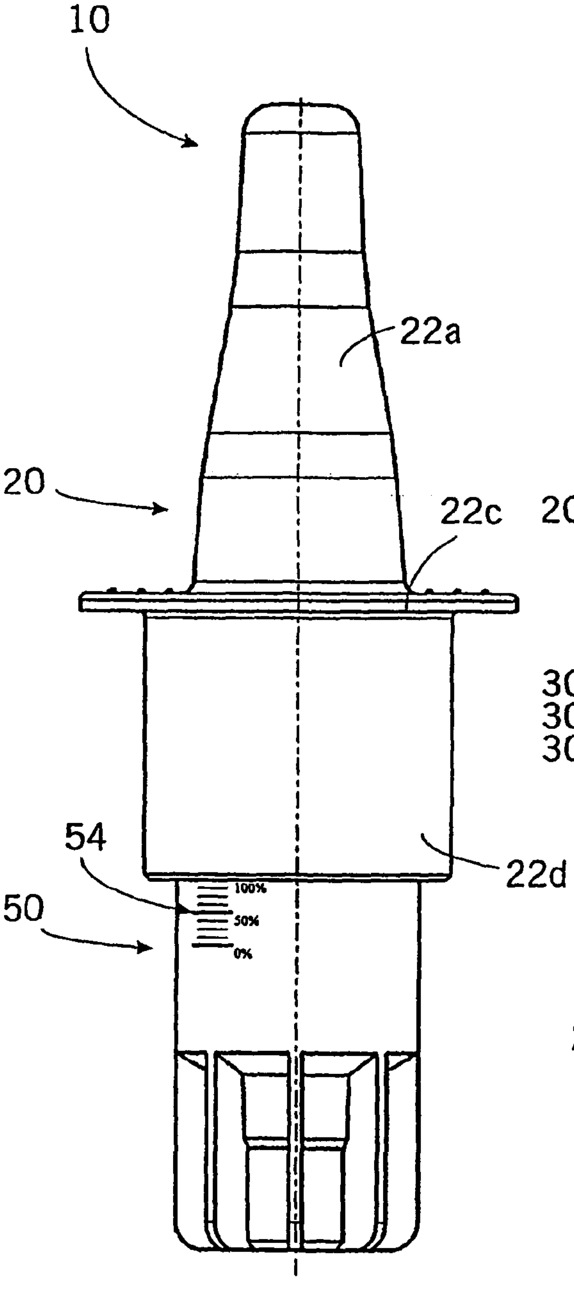
FIG. 1 shows a discharge device in accordance with the invention in an initial state before the first discharge process in a side view.
Figure 2:
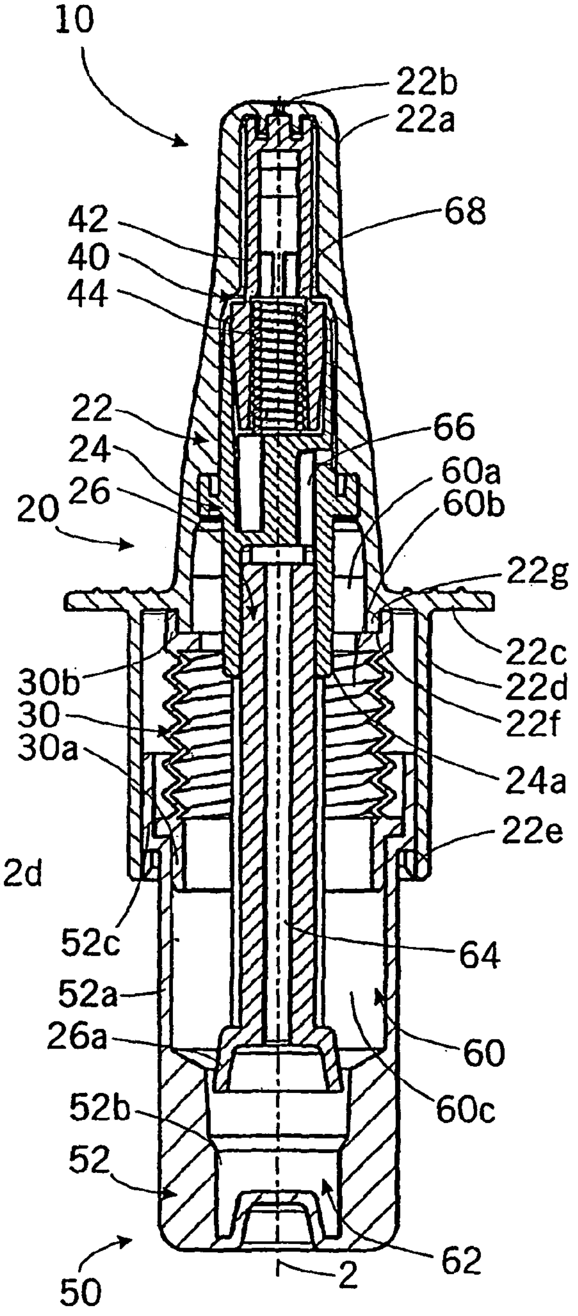
FIG. 2 shows the discharge device of FIG. 1 in the initial state shown in section.

FIGS. 1 and 2 show a discharge device 10 in accordance with the invention in an initial state.

The discharge device 10 has two housing sections 20, 50 movable relative to one another.

The upper housing section 20 has an outside component 22 comprising a nose olive 22*a* with a discharge opening 22*b* provided therein. Furthermore, the outside component 22 has a finger contact surface 22*c* adjoining the nose olive 22*a* at the bottom and extending radially outwards. A cylindrical guide collar 22*d* extends downwards from this finger contact surface 22*c*. An inside component 24 is inserted into the outside component 22, is firmly connected by a positive coupling to the outside component 22 and always remains stationary relative to the outside component 22 during operation. This inside component 24 arranged largely inside the nose olive 22*a* forms on one side the base for a pressure-controlled outlet valve 40. This outlet valve 40 has a valve body 42 that is pressed against the discharge opening 22*b* by a valve spring 44 abutting on the inside component 24. A downward facing coupling ring 24*a*, into which a piston component 26 is inserted, is integrally cast on the opposite end of the inside component 24. This piston component 26 assumes relative to the inside component 24 and hence also to the outside component 22 a fixed relative position unvarying during operation. The piston section 26*a* proper is provided at the lower end of the piston component 26 and its function is explained in the following.

The lower housing section 50 is formed by a single-piece component 52 designed hollow-cylindrical in its central section 52*a*. Below this central section 52*a*, the free inner area tapers in a series of steps. The bottom closure of the inner area of the component 52 is formed by a cavity 52*b* whose function is described in the following. A further hollow-cylindrical section 52*c* with enlarged inner and outer diameter adjoins the upper end of the central section 52*a* of the component 52.

The two housing sections 20, 50 are designed to be movable relative to one another in the direction of an actuating axis 2. For that purpose, the guide collar 22*d* of the upper housing section 20 and the cylindrical section 52*c* of the lower housing section 50 are adapted to one another in respect of their diameters such that they together form a guide permitting a relative movement of the housing sections 20, 50 only in the direction of the axis 2. The section 52*c* with the enlarged diameter is pushed into the guide collar 22*d* for this purpose and prevented from being pulled back out of it by engaging means 22*e*, not described in detail.

A bellows 30 is provided between the two housing sections 20, 50 in a position not accessible from the outside. This bellows is open at each of its two ends and has cylindrical coupling sections 30*a*, 30*b* at its ends. The lower coupling section 30*a* is in the assembled state pushed into the central section 52*a* of the component 52 in the manner shown in FIG. 2. The upper coupling section 30*b* is pushed onto an all-round coupling ridge 22*f* of the component 22. The coupling sections 30*a*, 30*b* are adapted to the respective contact sections 52*a*, 22*f* in such a way that liquid-tight connections are obtained. A coupling requiring more than mere pushing on is not needed, since the bellows 30 is only subjected to compression and not to tension during operation. In an alternative design, the bellows is designed in one piece with the component 22 or with the component 52, where the elastic deformability of the bellows in this case can be achieved by, for example, an appropriately adapted wall thickness of the bellows.

The following media-carrying areas are formed by the described housing sections and components: an inner cavity 60*a* formed by an inner wall 22*g*, the outside component 22 and the inside component 24; an adjoining area 60*b* formed by the inner area of the bellows 30; and an area 60*c* surrounded on the outside by the cylindrical central section 52*a* and by the stepped area of the component 52 adjoining it at the bottom together form a media reservoir 60. The already described cavity 52*b* inside the component 52 forms a dosage chamber 62 adjoining the media reservoir 60 at the lower end. Whereas in the initial state in FIG. 2 the media reservoir 60 and the dosage chamber 62 form a uniform large chamber and hence liquid exchange is possible without problem, a separation of the dosage chamber 62 from the media reservoir 60 is performed in the manner described in the following during the actuation. A liquid channel 64 extends from the dosage chamber 62 upwards through the piston component 26. This liquid channel 64 merges at its upper end into a liquid channel 66 inside the inside component 24. A narrow annular gap forming a pressure chamber 68 adjoining the channel 66 is located between the inside component 24 and the outside component 22. It depends on the positive pressure of the medium inside this pressure chamber 68 whether the outlet valve is opened or closed.

The mode of operation of the discharge device is explained in the following with reference to FIGS. 3*a* to 3*c*.

Figures 3A, 3B:
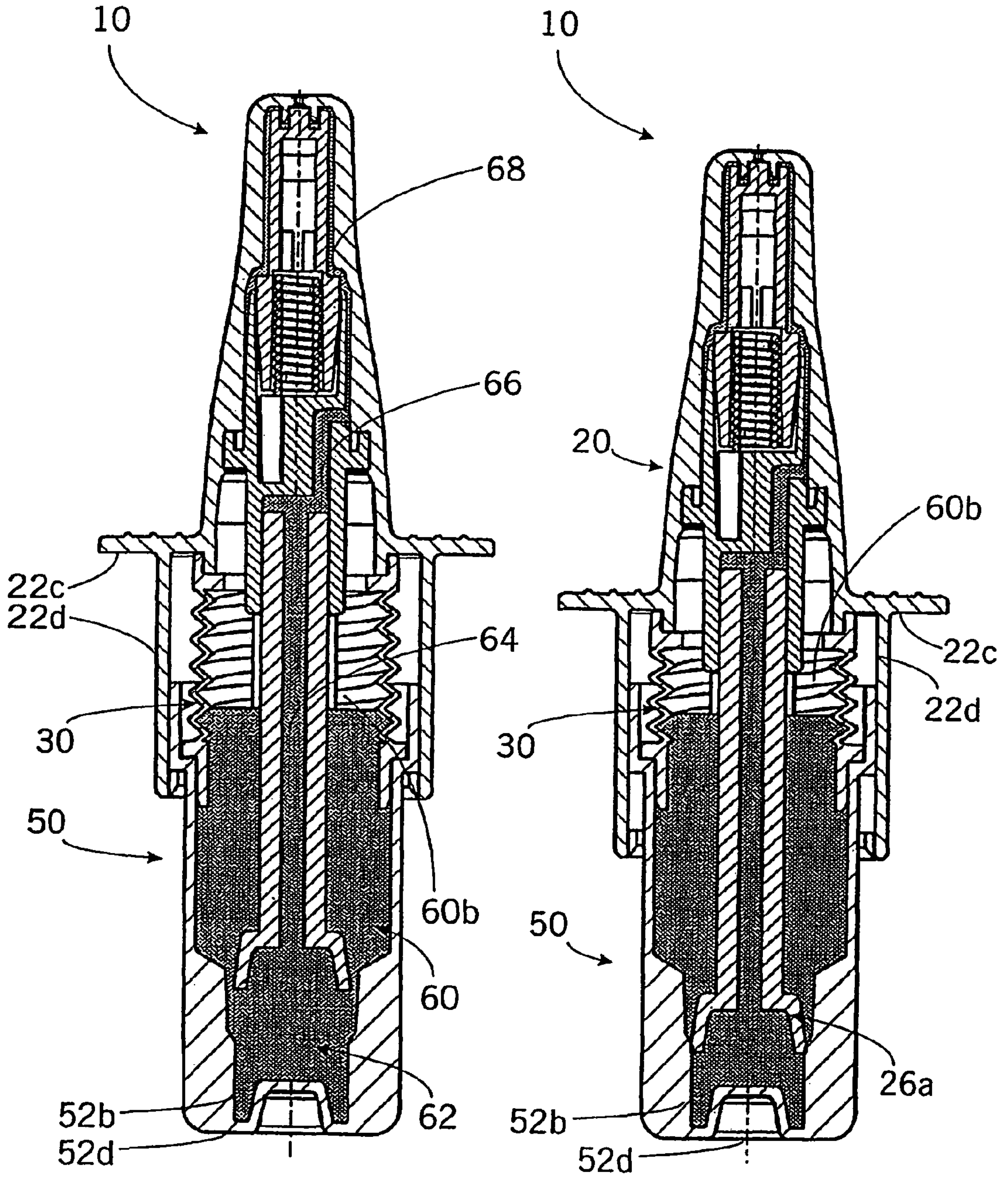
FIGS. 3*a* to 3*c* show the sequence of a discharge process, conducted with a discharge device shown in section and in accordance with FIGS. 1 and 2.
Figure 3C:
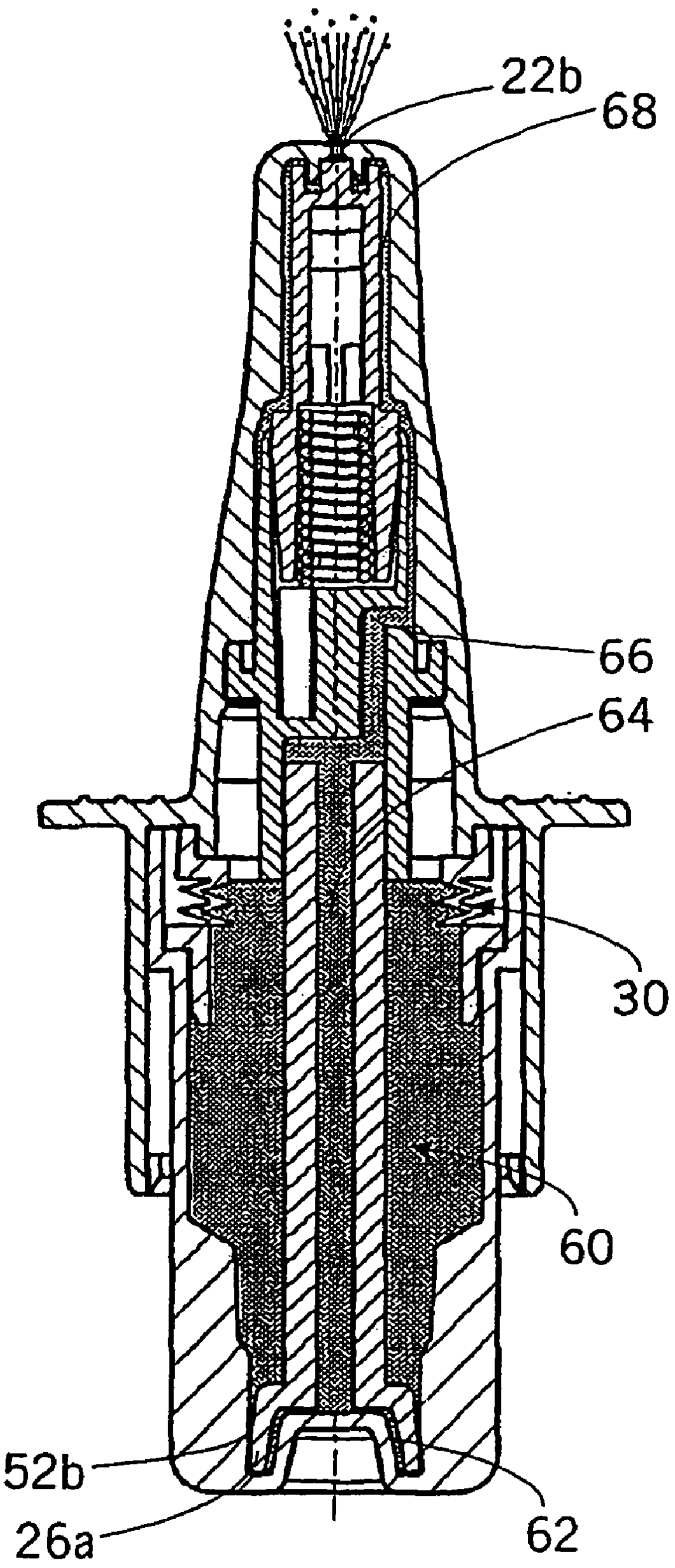
Figure 4:
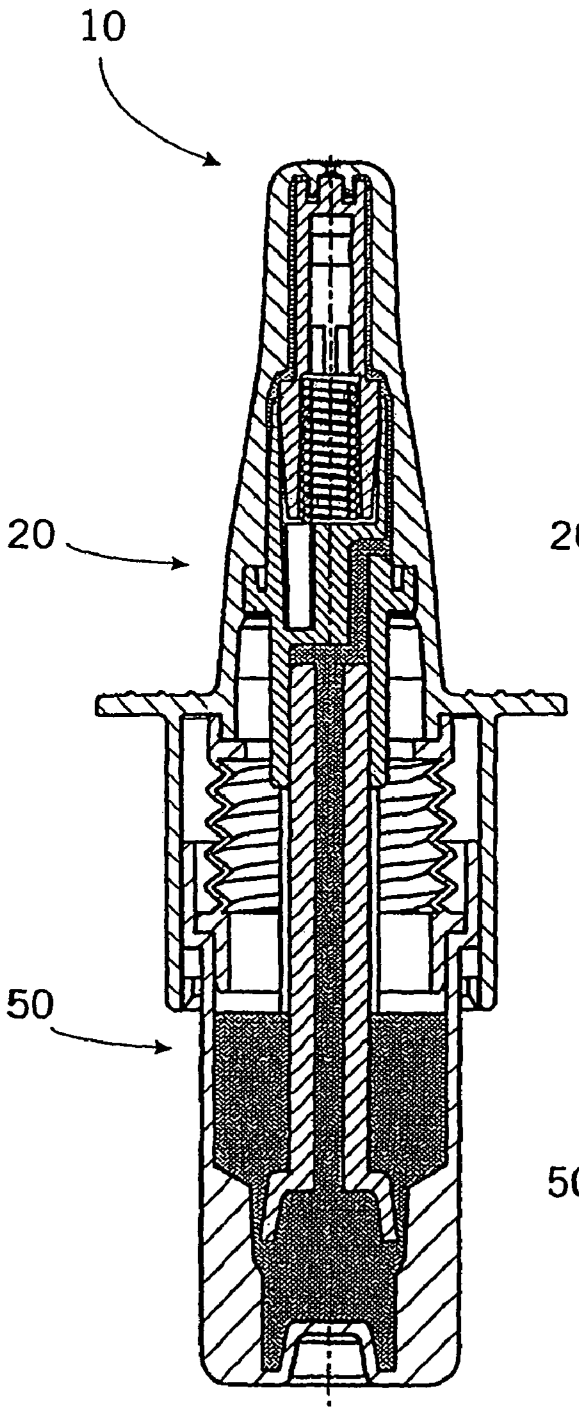
FIG. 4 shows the discharge device of the previous figures in a rest position after five discharge processes, in a sectional view.

The state in FIG. 3*a* corresponds to the state shown in FIGS. 1 and 2, where the medium, not shown in FIG. 2 for better comprehension, is shown in FIGS. 3*a* to 3*c* and in FIG. 4 in dotted form. FIG. 3*a* shows the initial state of the dispenser before its first use. For simplification, the media chamber and channels 64, 66, 68 are already filled with medium at this time. This filling can be done in the course of manufacture or effected by the user by means of an initial discharge actuation.

As shown in FIG. 3*a*, the media reservoir 60 and the dosage chamber 62 connected thereto are furthermore also filled with the medium, with FIG. 3*b* showing clearly that the media reservoir 60 is only partially filled with liquid. The liquid-free upper area of the media reservoir 60 is filled with air. The discharge device 10 is, in the state shown in FIG. 3*a*, in the rest position and accordingly not subjected to a force applied manually from the outside. The housing sections 20, 50 in this initial state shown in FIG. 3*a* are subjected to a sufficiently strong force by the spring effect of the bellows 30 that they assume their maximum distance from one another as shown.

Starting from this position shown in FIG. 3*a*, a force is subsequently applied manually to the discharge device 10, where to do so a user preferably places his index finger and middle finger on the finger contact surface 22*c* and his thumb on the bottom 52*d*. The housing sections 20, 50 are moved towards one another by the manual application of force such that the lower housing section 50 enters deeper into the recess of the upper housing section 20 formed by the guide collar 22*d*. This is achieved with simultaneous compression of the bellows 30. The volume reduction of the media reservoir 60, in particular of the area 60*b* of the media reservoir 60, is possible because the media reservoir 60 is filled partly with compressible air in the manner described. The pressing together of the housing sections 20, 50 leads initially to the intermediate state shown in FIG. 3*b*, where the piston section 26*a* comes into all-round contact with the rim of the cavity 52*b* and hence effects a separation of the dosage chamber 62 from the media reservoir 60. From this time onwards, a media exchange between the dosage chamber 62 and the media reservoir 60 is no longer possible.

During the continuation of the actuation movement, the piston section 26*a* is pressed deeper into the cavity 52*b*, reducing the volume of the dosage chamber 62. Since the latter is filled with non-compressible medium, this volume reduction leads directly to a pressure increase in the dosage chamber 62 and in the media chambers and channels 64, 66, 68. The accordingly likewise rising pressure in the pressure chamber 68 leads to an opening of the outlet valve 40 and hence to a discharge process through the discharge opening 22*b*, until the state shown in FIG. 3*c* is achieved, in which the piston section 26*a* comes into contact with the lower end of the cavity 52*b*. As soon as this is the case, the pressure in the media chambers and channels 62, 64, 66, 68 collapses and the discharge process ends.

During the transition from the initial state shown in FIG. 3*a* to the final state shown in FIG. 3*c*, the pressure in the media reservoir 60 is increased by manual actuation. This pressure increase leads to the formation of a kind of air spring exerting a resetting force in the direction of the initial position shown in FIG. 3*a*. This air spring forms together with the bellows 30, likewise acting as a spring, the return spring means of the discharge device 10.

After completion of the discharge process, the manual application of force on the housing sections 20, 50 by the user can be dispensed with and the housing sections 20, 50 move apart again due to the joint resetting force of the described air spring and of the elastically compressed bellows 30, so that the piston section 26*a* leaves the cavity 52*b* again and hence allows medium to flow from the media reservoir 60 back into the cavity 62 forming the dosage chamber 62. The discharge process can then be repeated.

The discharge device 10 shown has no air inlet into the media reservoir 60, so that the total quantity of medium and of air in the media reservoir continually falls over the service life of the discharge device. This, in conjunction with the low spring stiffness of the bellows 30, leads to the distance between the housing sections 20, 50 being reduced with every discharge process in the rest state, i.e. in the absence of an external force application. The bellows 30 is for this purpose intentionally designed such that the spring force it exerts is insufficient to move the housing sections 20, 50 back into the initial position shown in FIGS. 1, 2 and 3*a* after discharging of parts of the medium against the negative pressure generated thereby in the media reservoir 60.

Figure 5:
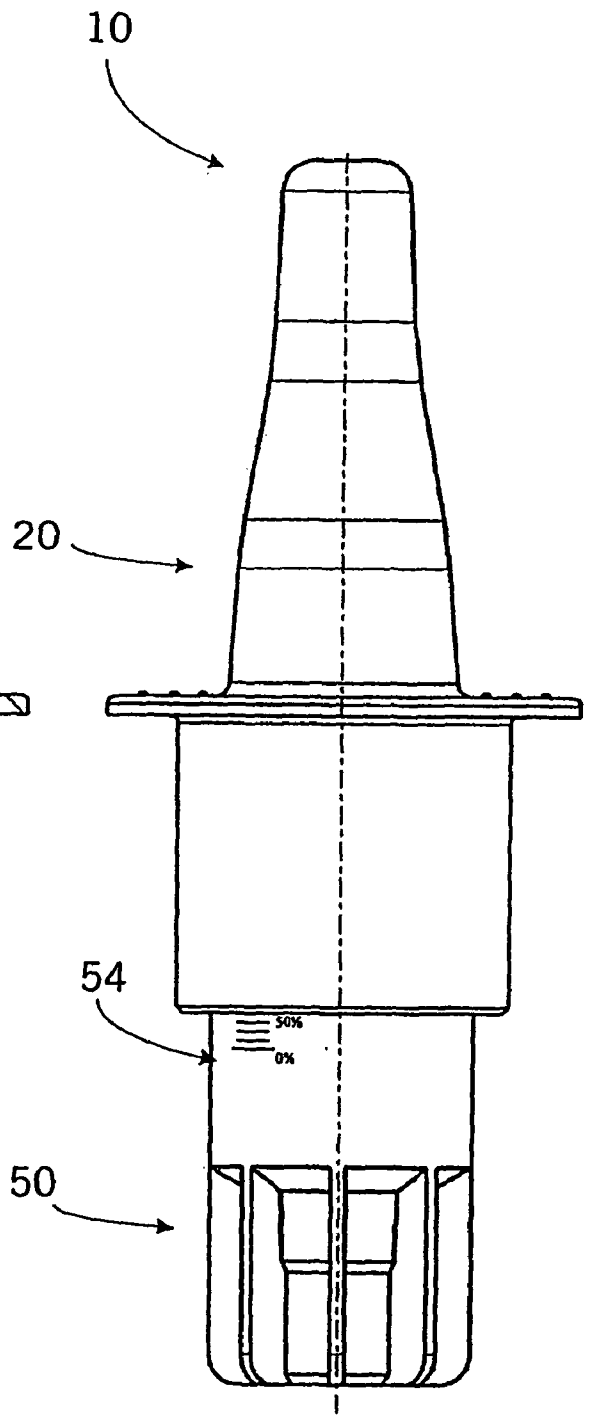
FIG. 5 shows the discharge device of the previous figures in a rest position after five discharge processes, in a side view.

The result of every discharge process is therefore a change in the rest position when compared with the initial position shown in FIGS. 1, 2 and 3*a*. FIGS. 4 and 5 show the discharge device 10 after five discharge processes in the altered rest position. The alteration in the rest state caused by these discharge processes can be readily discerned from the scale 54 on the outside of the lower housing section 50. In the initial state shown in FIG. 1 the scale shows a filling level of 100%. After the five discharge processes, the scale shows as a result of the altered rest position a remaining filling level of about 50%. It can therefore be very easily seen how full the media reservoir of the discharge device 10 still is.

The mode of operation of the discharge device 10 is not affected by the change in the rest position, since for its functioning it is only relevant that the piston section 26*a* breaks contact with the rim of the cavity 52*b* during the return stroke, so that the medium can flow into the dosage chamber 62.

The discharge device 10 described is intended for nasal applications. There are of course alternative designs conceivable for other applications, for example an embodiment for a dispenser to be used orally. Instead of the nose olive, therefore, other designs too for the outlet area can be provided in which the discharge direction does not have to match the actuation direction, but can for example be at an angle of 90°.

The invention claimed is:

1. A discharge device for a liquid media, having first and second housing sections movable relative to one another along a total stroke between a non-actuated rest position and an actuated end position and together forming an actuating device for manual discharge actuation, a media reservoir for storage of liquid media prior to discharge, the media reservoir containing liquid media and having a liquid-free portion containing air, the media reservoir being partially limited by: a first wall which is stationary relative to the first housing section; a second wall which is stationary relative to the second housing section; and a third wall formed by a variable-shape intermediate component fastened to the first housing section and to the second housing section, and a conveying device with a discharge opening and a dosage chamber, wherein the actuating device and the conveying device are operatively coupled such that during a first partial stroke of the manual discharge actuation starting from the rest position the media reservoir and the dosage chamber are in communicating connection, and during a second partial stroke of the manual discharge actuation following the first partial stroke the media reservoir and the dosage chamber are separated from one another, while the volume of the dosage chamber is reduced by the second partial stroke of the manual discharge actuation such that the media is pressed out of the dosage chamber to the discharge opening, the media reservoir being operatively coupled with the actuating device such that the manual discharge actuation of the actuating device during the second partial stroke, simultaneously with the reduction of the volume of dosage chamber, causes a volume reduction of the media reservoir by compressing the air in the media reservoir.

2. The discharge device according to claim 1, wherein the discharge device is designed such that a reduction of the liquid media contained in the media reservoir and/or of the air contained in the media reservoir causes a reduced distance between the first and second housing sections in the rest position.

3. The discharge device according to claim 1, wherein the media reservoir is connected to an environment only indirectly via the dosage chamber, and an outlet valve is provided between the dosage chamber and the discharge opening which prevents any inflow of air into the dosage chamber through the discharge opening.

4. The discharge device according to claim 1, wherein a scale or an indicator is provided in a contact area of the first and second housing sections by which the respective positions of the first and second housing sections relative to one another can be measured.

5. The discharge device according to claim 1, wherein the intermediate component is connected in an all-round sealing manner to the first housing section and to the second housing section.

6. The discharge device according to claim 1, wherein the intermediate component is elastic and in the end position applies a force to the first and second housing sections, said force pushing the first and second housing sections in the direction of the rest position.

7. The discharge device according to claim 1, wherein the intermediate component comprises a bellows.

8. The discharge device according to claim 7, wherein the bellows has a pair of open ends on respective opposite sides thereof, one of the open ends being connected in a generally circular manner to the first housing section and the other of the open ends being connected in a generally circular manner to the second housing section.

9. The discharge device according to claim 1, wherein the dosage chamber is formed by a cavity provided in one of the first and second housing sections that is open in the direction of the other of the first and second housing sections, and a piston section is provided on the other of the first and second housing sections and is designed to be in all-round contact with a rim of the cavity during the manual discharge actuation and during a transition from the first partial stroke to the second partial stroke to thereby separate the dosage chamber from the media reservoir.

10. The discharge device according to claim 1, wherein the dosage chamber is arranged relative to the media reservoir such that the media from the media reservoir flows into the dosage chamber as a result of the weight of the media when there is a communicating connection between the dosage chamber and the media reservoir.

11. The discharge device according to claim 1, wherein the first and second housing sections are guided in a manner permitting movement relative to one another by direct contact.

12. The discharge device according to claim 1, wherein the first housing section comprises the discharge opening and the second housing section comprises a bottom of the discharge device.

13. A discharge device for a liquid media comprising:

a discharge opening for discharging liquid media from said discharge device;

a dosage chamber;

first and second housing sections movably disposed relative to one another for manual actuation along a total stroke between a non-actuated rest position wherein liquid media is contained within said discharge device and an actuated end position wherein liquid media is discharged from said dosage chamber through said discharge opening;

a deformable intermediate section disposed between and interconnecting said first and second housing sections, said intermediate section having an hollow interior; and a media reservoir for storage of liquid media prior to discharge from said discharge opening and containing both liquid media and air, said first housing section, said second housing section and said hollow interior of said intermediate section all defining respective portions of said media reservoir, said media reservoir and said dosage chamber being in fluid communication with one another during manual actuation of said first and second housing sections along a first partial stroke starting from said non-actuated rest position, said media reservoir and said dosage chamber being out of fluid communication with one another during manual actuation of said first and second housing sections along a second partial stroke following said first partial stroke, a volume of each of said dosage chamber and said media reservoir being reduced during said second partial stroke such that the liquid media in said dosage chamber is forced out of said dosage chamber and through said discharge opening and such that the air in said media reservoir is compressed.

14. The discharge device according to claim 13, wherein said first housing section includes a cavity which defines said dosage chamber and said second housing section includes a piston non-movably connected thereto, wherein during a transition from said first partial stroke to said second partial stroke said piston contacts a portion of said first housing section disposed adjacent said cavity and separates said cavity from said media reservoir to prevent fluid communication therebetween.

15. The discharge device of claim 14, wherein said piston has a first end non-movably connected to said second housing section and a second end disposed in said first housing section adjacent said cavity, said portion of said first housing section defining an annular shoulder located within and defining part of said cavity and said first housing section including an end wall which defines a lower extent of said cavity, said second end of said piston being disposed in contact with said annular shoulder during the transition from said first partial stroke to said second partial stroke and moving towards said end wall during said second partial stroke, and said second end of said piston being disposed in contact with said end wall at an end of said total stroke.

16. The discharge device of claim 14, wherein said piston defines therein a channel in fluid communication with said discharge opening and said cavity, wherein liquid media is discharged from said cavity through said channel and outwardly through said discharge opening during said second partial stroke.

17. The discharge device of claim 13, wherein said first housing section includes said dosage chamber and said second housing section includes said discharge opening.

18. The discharge device of claim 13, wherein said intermediate section comprises a bellows connected adjacent one end portion thereof to said first housing section and connected adjacent another end portion thereof to said second housing section, said bellows and the air in said media reservoir compressing during movement of said first and second housing sections towards one another from said rest position to said actuated end position, said bellows and the air in said media reservoir decompressing upon the cessation of manual actuation and exerting a resetting force on said first and second housing sections towards said rest position.

* * * * *